United States Patent [19]

Okuyama et al.

[11] Patent Number: 4,680,526
[45] Date of Patent: Jul. 14, 1987

[54] METHOD OF CONTROLLING INVERTER-DRIVEN INDUCTION MOTOR

[75] Inventors: Toshiaki Okuyama, Ibaraki; Takayuki Matsui, Hitachi; Noboru Fujimoto, Hitachi; Yuzuru Kubota, Hitachi, all of Japan

[73] Assignee: Hitachi, Ltd., Tokyo, Japan

[21] Appl. No.: 766,945

[22] Filed: Aug. 19, 1985

[30] Foreign Application Priority Data

Aug. 21, 1984 [JP] Japan .................................. 59-173713
Apr. 5, 1985 [JP] Japan .................................. 60-72875

[51] Int. Cl.⁴ .............................................. H02P 5/40
[52] U.S. Cl. .................................. 318/802; 318/805; 318/808
[58] Field of Search ......... 318/800, 802, 803, 807–811

[56] References Cited

U.S. PATENT DOCUMENTS

| | | | |
|---|---|---|---|
| 3,989,991 | 11/1976 | Brennen et al. | 318/805 |
| 4,451,771 | 5/1984 | Nagase et al. | 318/800 |
| 4,459,534 | 7/1984 | Nagase et al. | 318/811 |
| 4,503,376 | 3/1985 | Okuyama | 318/805 |

Primary Examiner—David Smith, Jr.
Attorney, Agent, or Firm—Antonelli, Terry & Wands

[57] ABSTRACT

In induction motor driven by a voltage-type inverter, the torque current component is determined by detecting a primary current flowing to the induction motor. On the basis of the torque current component determined, the output voltage and frequency of the voltage-type inverter are controlled. Additionally, the rotational speed of the induction motor is estimated on the basis of the detected torque current component and the speed of the induction motor is controlled such that the estimated speed signal coincides with a speed command signal.

2 Claims, 19 Drawing Figures

F I G. 2a
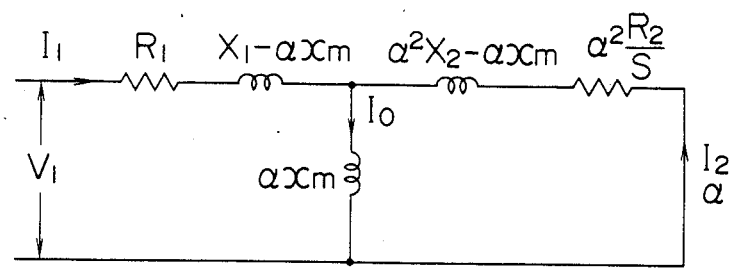
F I G. 2b
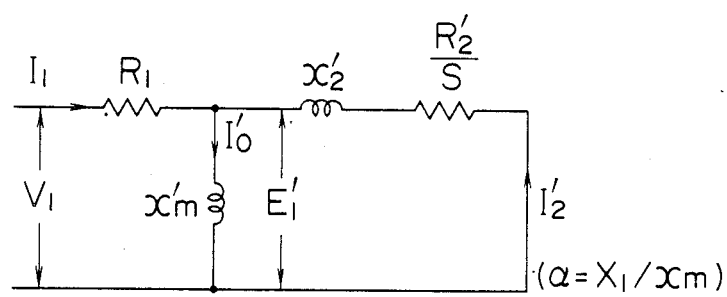

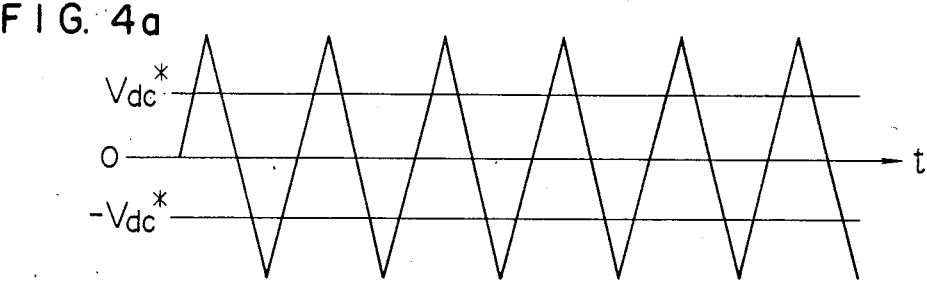
FIG. 4a
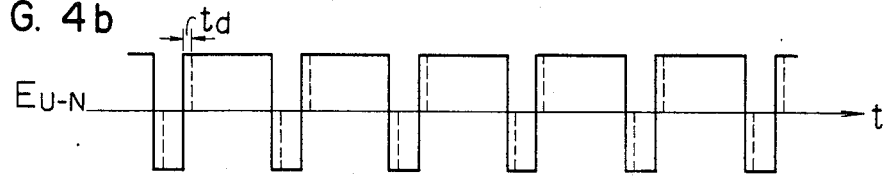
FIG. 4b
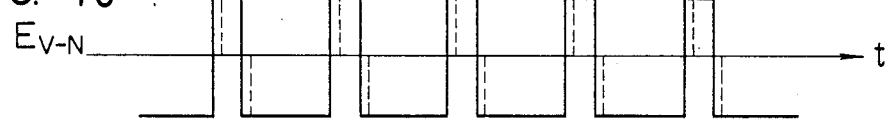
FIG. 4c
FIG. 4d
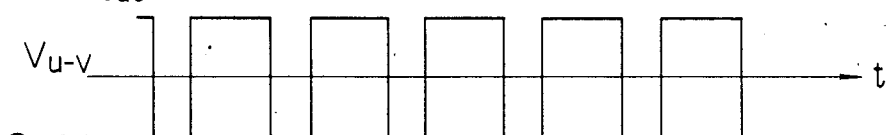
FIG. 4e $i_{dc} > 0$
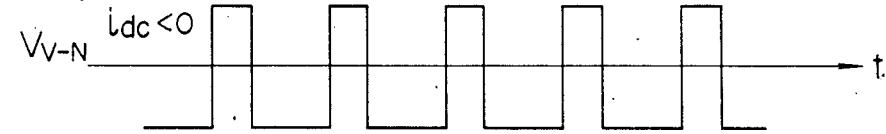
FIG. 4f $i_{dc} < 0$

METHOD OF CONTROLLING INVERTER-DRIVEN INDUCTION MOTOR

BACKGROUND OF THE INVENTION

The present invention relates to a control method for an induction motor, wherein a primary current thereof is resolved into a torque current component and an exciting current component which are separately controlled independent of each other for controlling relational speed of the induction motor.

In connection with the control of an induction motor, a vector control method has heretofore been known in which the primary current of the motor is resolved into a torque component and an excitation component which are separately controlled independent of each other. By adopting the vector control method, a speed control of the induction motor can be accomplished with a high speed response as in the case of a direct current motor.

The vector control method for the induction motor may be generally classified into a magnetic flux detection type vector control and a slip frequency control type vector control method. The former type control method is disclosed, for example, in U.S. Pat. No. 3,824,437 (corresponding to West-German Laid-Open (DOS) No. 1941312). A typical example of the latter type is disclosed in Japanese Patent Application Laid-Open No. 11125/1976. In the case of the magnetic flux detection type vector control, a magnetic flux detector has to be incorporated in the induction motor. Consequently, this type control method can not be employed in an induction motor designed for general purpose. Under the circumstances, the slip frequency control type vector control method has attracted attention in the recent years and is actually adopted in practical applications.

The slip frequency control type vector control method for the induction motor is based on the control of the output frequency of an inverter unit in dependence on the rotational speed of the motor. Consequently, signal conductors or cables are required for the output of a speed detector (or angular position detector) as well as for interconnection between the speed detector and the inverter unit, thus involving a complicated configuration of the system and troublesome procedure for application of this type of vector control method to the existing induction motor.

As an attempt to circumvent the disadvantages mentioned above, there has been proposed a so-called speed-sensorless vector control system for the induction motor in which no speed detector or sensor is employed and in which the motor current (primary current) and the frequency are controlled on the basis of the magnetic flux of the motor determined arithmetically from a terminal voltage of the motor, as is reported by Marian P. et al in their article titled "A Simple Control System for Current Source Inverter-Fed Induction Motor Drives" in IEEE (1983).

However, in the case of the speed-sensorless vector control system described in the literature cited above, there remain unsolved problems such as core saturation phenomenon in an insulating transformer employed for detecting the motor voltage, drift in an integrator for arithmetically determining or calculating the magentic flux and others, rendering it difficult or impossible to attain satisfactory accuracy in the calculation of the magnetic flux particularly in a low-frequency operation mode, thus stable operation cannot be assured.

SUMMARY OF THE INVENTION

An object of the present invention is to provide a control method for an induction motor which allows the rotational speed of the induction motor to be controlled with an improved accuracy without using detectors such as speed detectors voltage detectors or the like.

Another object of the invention is to provide a control method for an induction motor which can assure highly accurate control of the induction motor by preventing control performance characteristics from being degraded due to internal voltage drop in a voltage-type inverter driving the induction motor and by suppressing occurrences of ripple in torque.

In view of the above and other objects which will be apparent as the description proceeds, it is proposed according to a general feature of the invention that the output voltage and frequency of an inverter are controlled in dependence on a component of the primary current of an induction motor driven by the inverter, which component is in phase with a reference phase of the output voltage of the inverter, and that the rotational speed or frequency of the induction motor is controlled in accordance with a frequency command which in turn is determined from the aforementioned current component.

According to another aspect of the invention, a voltage drop in the inverter circuit is arithmetically determined on the basis of an inverter output current detection signal, wherein the output voltage command is correctively modified on the basis of the result of the arithmethic determination.

BRIEF DESCRIPTION OF THE DRAWINGS

FIG. 2a is a view illustrating a general equivalent circuit of an induction motor;

FIG. 2b is a view illustrating an equivalent circuit of the induction motor in which primary leakage reactance is eliminated;

FIG. 4a–4f is a view showing signal waveforms for illustrating operation of the PWM inverter;

DESCRIPTION OF THE PREFERRED EMBODIMENTS

Now, the control method for an induction motor according to the invention will be described in detail by referring to the accompanying drawings.

Figure 1:
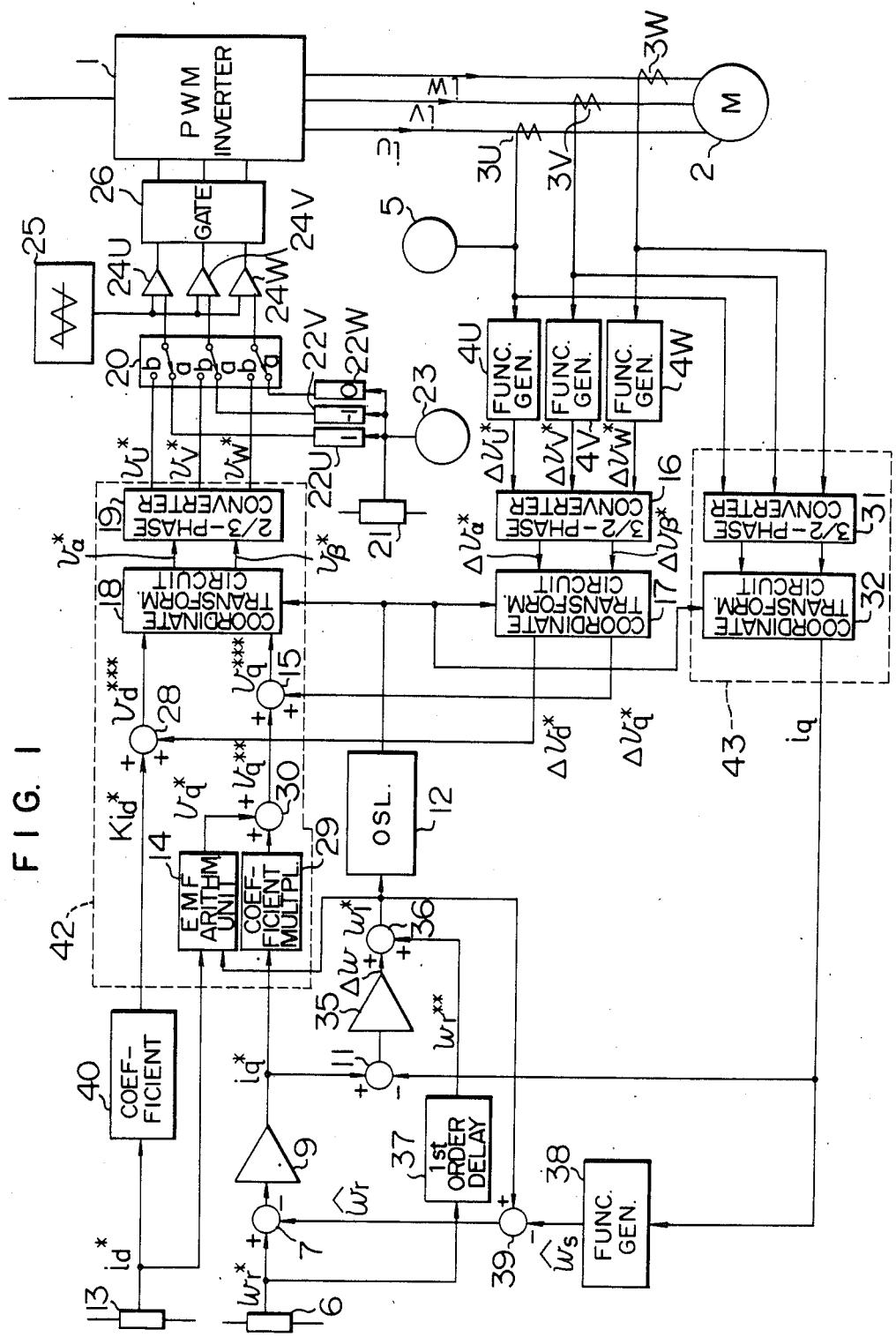
FIG. 1 is a circuit diagram showing a configuration of a control circuit for a PWM (pulse width modulation) inverter system according to an exemplary embodiment of the invention.

FIG. 1 shows a PWM (pulse width modulation) type control system for an induction motor according to an embodiment of the present invention.

At first, description will be made on a basic structure of a vector control apparatus of the so-called speed-sensorless type (i.e. having no speed sensor) to which the invention is directed.

Referring to FIG. 1, a numeral 1 denotes a PWM inverter for converting a DC voltage to an AC voltage of a variable frequency. The inverter 1 is composed of self-extinction elements interconnected in Graetz connection, each of the self-extinction elements having a feedback diode connected in antiparallel therewith. As the self-extinction element, a solid state switching element such as a transistor or gate-turn-off (GTO) thyristor may be mentioned employed. An induction motor 2 is connected to AC output terminals of phases U, V and W of the inverter 1. The primary currents $i_u$, $i_v$, $i_w$ of U-, V- and W-phases of the induction motor 2 (equivalent to the output phase currents of the inverter 1) are detected by current detectors 3U, 3V and 3W, respectively.

A reference numeral 6 denotes a speed command circuit for producing a speed command signal $\omega_r^*$ which is applied to an adder 7 and compared with an estimated speed signal $\hat{\omega}_r$ supplied from an adder 39, resulting in a deviation between the signals $\omega_r^*$ and $\hat{\omega}_r$ which is outputted from the adder 7. In response to the deviation signal, a speed deviation amplifier 9 correspondingly outputs a command signal $i_q^*$ for a torque current component $i_q$ of the motor current, as described hereinafter. The command signal $i_q^*$ is applied to an adder 11 and a coefficient multiplier 29. The adder 11 determines a deviation between the command signal $i_q^*$ and the torque component signal $i_q$ derived through a coordinate transformation circuit 32 (described hereinafter in more detail). The deviation signal called outputted from the adder 11 is supplied to a current deviation amplifier 35 which in turn produces as the output signal a frequency control signal $\Delta\omega$, in correspondence with the deviation signal. The signal $\Delta\omega$ is applied to an adder 36 where the signal $\Delta\omega$ is added with an output signal $\omega_r^{**}$ supplied from a first order delay circuit 37 (a signal having a time lag of first order relative to the speed command signal $\omega_r^*$), whereby a frequency indicating command signal $\omega_1^*$ is produced by the adder 36.

An oscillator 12 produces a sinusoidal signal having a frequency proportional to the aforementioned speed command signal $\omega_i^*$ and a constant amplitude (this signal serves as a phase reference signal for the inverter output voltage). The sinusoidal signal output from the oscillator 12 is supplied to coordinate transformation circuits 17, 18 and 32, respectively.

The current detection signals $i_u$, $i_v$ and $i_w$ are supplied to a three-phase/two-phase conversion circuit 31, whereby the three phase signals $i_u$, $i_v$ and $i_w$ are converted to two phase signals $i_\alpha$ and $i_\beta$. These signals $i_\alpha$ and $i_\beta$ are supplied to the coordinate transformation circuit 32 which transforms the signals $i_\alpha$ and $i_\beta$ to a component signal $i_q$ which is in phase with the latter, respectively, on the basis of the sinusoidal signal supplied from the oscillator 12.

The signal $i_q$ is applied to the aforementioned adder 11 and a function generator 38 which generates a slip frequency signal $\hat{\omega}_s$ (of an estimated value) on the basis of the input signal $i_q$. The estimated slip frequency signal $\hat{\omega}_s$ is supplied to an adder 39 to be subtracted from the aforementioned frequency command signal $\omega_1^*$, whereby the estimated value $\hat{\omega}_r$ of rotational speed of the induction motor 2 is outputted from the adder 39 to be subsequently applied to the adder 7 mentioned above.

A reference numeral 13 denotes an exciting current command circuit which produces as the output thereof a motor exciting current command $i_d^*$ which is then supplied to an arithmetic unit 14 for determining the induced electromotive force (also referred to as EMF arithmetic unit) and to a coefficient multiplier 40 which functions to multiply the input signal $i_d^*$ with a factor K to output a signal $K \cdot i_d^*$ which in turn is supplied to an adder 28.

A coefficient circuit 29 serves to multiply the torque current command signal $i_q^*$ with the factor K to produce an output signal $K \cdot i_q^*$ which is then applied to an adder 30 to be added with the output signal $V_q^*$ of the EMF arithmetic unit 14, resulting in an updated voltage command signal $V_q^{**}$ to be subsequently applied to an adder 15. Signals $\Delta V_d^*$ and $\Delta V_q^*$ applied to the address 15 and 28, respectively, will be described hereinafter. It should be mentioned here that the output signal $V_d^{*}$ from the adder 28 and the output signal $V_q^{*}$ of the adder 15 are applied to the input of the coordinate transformation circuit 18 which serves to transform quantities in a rotating magnetic field coordinate system (or i.e. flux orientated reference frame) to those in a stator coordinate system (i.e. stator reference frame) on the basis of the sinusoidal signal produced by the oscillator 12, as the result of which two-phase AC signals $V_\alpha^*$ and $V_\beta^*$ in the stator reference frame are derived from the output of the coordinate transformation circuit 18. The signals $V_\alpha^*$ and $V_\beta^*$ are then supplied to a two-phase/three-phase converter 19, whereby voltage command signals $V_u^*$, $V_v^*$ and $V_w^*$ are drived from the phase number converter 19, which signal have a frequency, proportional to the frequency command signal $\omega_1^*$ and being mutually phase-shifted by 120°. The signals $V_u^*$, $V_v^*$ and $V_w^*$ are then applied to a switch circuit 20.

The output signals of the switch circuit 20 are applied to comparators 24U, 24V and 24W, respectively, to be compared with a carrier signal for pulse width modulation as supplied from an oscillator 25, whereby pulse width modulating or PWM pulse signals for turning on and off the associated switching elements of the PWM inverter 1 are produced, respectively. A gate circuit 26 served to supply gate signals to the switching elements of the PWM inverter 1 in response to the output pulse signals produced by the comparators 24U, 24V and 24W, respectively. The circuit configuration described so far concerns the vector control in which no speed sensor is made use of.

Next, description will be made on circuit components which play roles in compensating for the voltage drop occurring in the voltage type inverter 1.

Function generators 4U, 4V and 4W produce signals $\Delta V_u^*$, $\Delta V_v^*$ and $\Delta V_w^*$ which are proportional to voltage drops in the inverter and motor windings as well as wirlng conductors, in dependence on magnitude and polarities of the output signals from the current detectors 3U, 3V and 3W. These signals $\Delta V_u^*$, $\Delta V_v^*$ and $\Delta V_w^*$ are applied to a three-phase/two-phase converter 16 to be converted to two phase signals $\Delta V_\alpha^*$ and $\Delta V_\beta^*$ which are then supplied to the coordinate transformation circuit 17 where the signals $\Delta V_\alpha^*$ and $\Delta V_\beta^*$ are transformed on the basis of the sinusoidal signal produced by the oscillator 12 to component signals $\Delta V_d^*$ and $\Delta V_q^*$ which are, respectively, delayed by 90° and in phase with the induced eletromotive force. The signal $\Delta V_q^*$ outputted from the circuit 17 is applied to the adder 15 to be added with the signal $V_q^{}$ outputted from the adder 30, whereby the updated voltage command signal $V_q^{*}$ is produced by the adder 15. On the other hand, the other output signal $\Delta V_d^*$ of the coordinate transformation circuit 17 is applied to the adder 28 to be added with the signal $K \cdot i_d^*$ to create a voltage command signal $V_d^{***}$. The circuit configuration described above serves to compensate for the voltage drop in the inverter 1.

Now, description will be directed to the principle of the inverter control system underlying the concept of the present invention. FIG. 2a shows a general equivalent circuit of an induction motor. Since $\alpha$ can be selected arbitrarily, the primary leakage reactance can be made zero by correspondingly selecting the value of $\alpha$, whereby an equivalent circuit shown in FIG. 2b is resulted. In connection with the equivalent circuits.

$$\alpha = X_1/x_m \quad (1)$$

$$x'_m = X_1 = x_m + x_1 \quad (2)$$

$$x_2' \approx \frac{(x_m + x_1)(x_1 + x_2)}{x_m} \quad (3)$$

where
- $x_m$: exciting reactance,
- $X_1$: primary reactance,
- $x'_m$: exciting reactance (after conversion to equivalence), and
- $x'_2$: secondary reactance (after conversion to equivalence).

In this case, relations among the exciting current $I_0'$, the primary current $I_1$ and torque $T$ are given by $$\dot{I}_1 = \left(1 + \frac{jSx_m'}{R_2' + jSx_2'}\right) \dot{I}_0' \quad (4)$$

$$T = \frac{3p}{\omega_1} \cdot \frac{R_2'}{S} \cdot \frac{(Sx_m')^2}{R_2'^2 + (Sx_2')^2} |\dot{I}_0'|^2 \quad (5)$$

$$\dot{V}_1 = \dot{E}_1' + R_1\left(1 + \frac{jSx_m'}{R_2' + jSx_2'}\right) \dot{I}_0' \quad (6)$$

$$\dot{E}_1' = jx_m \dot{I}_0 \quad (7)$$

where
- j: imaginary number,
- S: slip,
- $R'_2$: secondary resistance (after conversion to equivalence),
- $\omega_1$: primary angular frequency,
- $R_1$: primary resistance, and p: number of paired poles.

Assuming that the exciting current $I'_0$ is constant and motor constants are invariable, the primary current $I_1$ and torque $T$ are functions only of the slip angular frequency $\omega_s$. Accordingly, the slip angular frequency $\omega_s$ and the primary current $I_1$ can be definitely determined as a function of the torque $T$, which in turn means that the torque $T$ and the primary current $I_1$ can be controlled in dependence on the slip angular frequency $\omega_s$.

On the other hand, the condition that the exciting current $I'_0$ be constant can be realized by controlling the voltage magnitude $|E_1'|$ so as to be proportional to the angular frequency $\omega_1$. This can be accomplished by taking into account the voltage drop $R_1 \dot{I}_1$ due to the primary resistance in determination of the primary voltage $\dot{V}_1$, as will be seen in the expression (6).

In view of the relations elucidated above, the control operation of the inverter control apparatus shown in FIG. 1 will be described. For simplification of the description, it is first assumed that the signals $\Delta V_d^*$ and $\Delta V_q^*$ are zero, respectively.

First, operation for holding the exciting current $|I'_0|$ constant will be described. The oscillator 12 generates a sinusoidal signal (providing phase reference for the induced electromotive force) having a frequency proportional to the frequency command signal $\omega_1^*$. In a voltage command calculator 42 of the circuit configuration shown as enclosed in a broken line block in FIG. 1, the frequency command $\omega_1^*$ is multiplied with the aforementioned sinusoidal signal to create an electromotive force command $e_1^*$ having magnitude and frequency proportional to the frequency command $\omega_1^*$. Further, the voltage drops $R_1 i_1$ due to the primary resistance are derived from the detected current signal $i_1$ ($i_u$, $i_v$, $i_w$) and added to the electromotive force command $e_1^*$ to create the primary voltage command $V_1^*$ ($V_u^*$, $V_v^*$, $V_w^*$) in the form of three-phase sinusoidal signal.

More specifically, it is assumed that one of the axes of the orthogonal rotating field coordinate system (flux orientated reference frame) is referred to as d-axis with the axis orthogonal to the d-axis termed q-axis, and d- and q-axis components of the primary current and the primary voltage are represented by $i_d$, $i_q$ and $V_d$, $V_q$, respectively. The oscillator 12 generates two phase sinusoidal signals of a frequency proportional to the frequency command signal outputted from the adder 36. The two phase sinusoidal signals are out of phase by 90° with each other and thus given by $\cos \omega_1 t$ and $\sin \omega_1 t$. The former serves as the phase reference signal for the excitation component of U-phase, while the latter serves as the phase reference signal for the induced electromotive force of U-phase.

In the coordinate transformation circuit 18, the following arithmetic operation is performed to derive voltage command signals of two phases $V_\alpha^*$ and $V_\beta^*$.

$$\begin{bmatrix} V_\alpha^* \\ V_\beta^* \end{bmatrix} = \begin{bmatrix} \cos\omega_1 t & -\sin\omega_1 t \\ \sin\omega_1 t & \cos\omega_1 t \end{bmatrix} \begin{bmatrix} V_d^{*} \\ V_q^{*} \end{bmatrix} \quad (8)$$

Further, in the phase number converter 19, the voltage command signals of three phases $V_u^*$, $V_v^*$ and $v_w^*$ are derived in accordance with the following expressions:

$$\begin{bmatrix} V_u{}^* \\ V_v{}^* \\ V_w{}^* \end{bmatrix} = \begin{bmatrix} 1 & 0 \\ -\tfrac{1}{2} & \sqrt{3}/2 \\ -\tfrac{1}{2} & -\sqrt{3}/2 \end{bmatrix} \begin{bmatrix} V_\alpha{}^* \\ V_\beta{}^* \end{bmatrix} \quad (9)$$

The voltage command signals $V_u{}^*$, $V_v{}^*$ and $V_w{}^*$ as derived can be expressed as follows:

$$V_u{}^* = A\cos(\omega_1 t + \theta)$$

$$V_v{}^* = A\cos(\omega_1 t - \tfrac{2}{3}\pi + \theta)$$

$$V_w{}^* = A\cos(\omega_1 t + \tfrac{2}{3}\pi + \theta) \quad (10)$$

$$A = \sqrt{(V_d{}^{*})^2 + (V_q{}^{*})^2} \quad (11)$$

$$\theta = \tan^{-1}\frac{V_q{}^{*}}{V_d{}^{*}} \quad (12)$$

where $\omega_1$ represents the angular frequency of the signal generated by the oscillator 12.

From the expressions (8) and (9), the voltage command signal $v_u{}^*$ is given by $$V_u{}^* = V_d{}^{*}\cos\omega_1 t - V_q{}^{*}\sin\omega_1 t \quad (13)$$

The above expression (13) can also be rewritten as follows:

$$\dot V_u{}^* = V_d{}^{*} + jV_q{}^{*} \quad (13')$$

By applying the expression (6) to the V-phase, $$\dot V_u + \dot E'_u + R_1\left(1 + \frac{jSX'_m}{R'_2 + jSX'_2}\right)\dot I'_0 = R_1\dot I'_0 + j\left(X'_m \dot I''_0 + \frac{SX'_m \dot I''_0}{R'_2 + jSX'_2} R_1\right) \quad (14)$$

where $V_u$: terminal voltage of U-phase, and
$E'_u$: induced electromotive force of U-phase.

Accordingly, from the expressions (13) and (14)

$$\left.\begin{array}{l}\dot V_d{}^{*} = kR_1 |\dot I'_0| \\ \dot V_q{}^{*} = k(X'_m |\dot I'_0| + R_1 |\dot I_q|)\end{array}\right\} \quad (15)$$

where k: gain of voltage control, and $$I_q = \frac{SX'_m \dot I'}{R'_2 + jSX'_2}$$

In this manner, the command voltages $V_d{}^{*}$ and $V_q{}^{*}$ can be controlled in accordance with the expression (15).

Since $i_d{}^*$ represents the command value for $|\dot I'_0|$ while $i_q{}^*$ represents the command value for $|\dot I_q|$, the command voltages $V_d{}^{*}$ and $V_q{}^{*}$ are determined as follows:

$$V_d{}^{***} = kR_1 i_d{}^* \quad (16)$$

$$V_q{}^{***} = k(X'_m i_d{}^* + R_1 i_q{}^*)$$

where $i_d{}^* = |\dot I'_0|$ and $i_q{}^* = |\dot I_q|$

In the PWM control circuit (24U, 24V, 24W), the primary voltage command $\dot V_1{}^*$ is compared with the carrier signal for performing the pulse width control well known in the art, whereby the output voltage of the PWM inverter 1 is so controlled that the instantaneous value of the output voltage is in proportion to the primary voltage command $\dot V_1{}^*$. In this way, the motor voltage is controlled in accordance with the expression (6) to maintain the exciting current $|\dot I'_0|$ constant.

Next, description is directed to the operation for controlling the motor current, torque and the rotational speed (angular speed).

Relations among magnitude of the primary current $|\dot I_1|$, the component $\dot I_q$ (where $|\dot I_q| \equiv i_q$) orthogonal to the exciting current component $\dot I'_0$ (where $|\dot I'_0| \equiv i_d$) of the primary current $\dot I_1$ (i.e. the component having phase difference of 90° relative to the exciting current $\dot I'_0$ and thus in phase with the induced electromotive force $\dot E'_1$), torque T and the exciting current $i_d$ are given by $$|\dot I_1| = \sqrt{\frac{\left(\frac{R'_2}{\omega_s}\right)^2 + (l'_2 + M')^2}{\left(\frac{R'_2}{\omega_s}\right)^2 + l'^2_2}} \cdot i_d{}^2 \quad (17)$$

$$i_q = \frac{\left(\frac{R'_2}{\omega_s}\right)}{\left(\frac{R'_2}{\omega_s}\right)^2 + l'^2_2} \cdot M' i_d \quad (18)$$

$$\approx \frac{\omega_s}{R'_2} M' i_d \left(\frac{R'_2}{\omega_s} \gg l'_2\right) \quad (18')$$

$$T = 3p\left(\frac{R'_2}{\omega_s}\right)\frac{M'^2}{\left(\frac{R'_2}{\omega_s}\right)^2 + l'^2_2} \cdot i_d{}^2 \quad (19)$$

On the condition that the magnitude of the exciting current $i_d$ is constant, the various values given by the above expressions are functions only of $(R'_2/\omega_s)$ and thus can be controlled in dependence on the slip frequency $\omega_s$. Further, torque T bears a proportional relation to the current component $i_q$, thus allowing the current component $i_q$ to be considered equivalent to torque. The current component $i_q$ is detected by the current component detecting circuit designated by a broken line block 43 in FIG. 1 in accordance with $$i_q = e_\alpha \cdot i_\alpha + e_\beta \cdot i_\beta \quad (20)$$

where $i_\alpha = i_U$, $$i_\beta = \frac{1}{\sqrt{3}}(i_V - i_W),$$

$i_U$, $i_V$, $i_W$ = instantaneous values of U-, V- and W-phase currents, $e_\alpha = e_U = -\sin\omega_1 t$, and $$e_\beta = \frac{1}{\sqrt{3}} (e_V - e_W) = \cos \omega_1 t$$

In the above expression, $e_U$, $e_V$ and $e_W$ are the phase reference signals for the induced electromotive force of U-, V- and W-phases, respectively, and have a constant amplitude as well as phase which coincides with that of the electromotive force. It should be mentioned that in the voltage command calculator 42, these signals are multiplied with the frequency command $\omega_1^*$ to prepare an electromotive-force command $e^*$ for each phase.

The current component $i_q$ thus detected is compared with the torque command $T^*$ ($\alpha i_q^*$) at the adder 11, wherein the resultant deviation is utilized for adjusting the slip angular frequency (output frequency of the inverter) $\hat{\omega}_s$ in accordance with the frequency control signal $\Delta \omega$ which depends on the deviation, whereby torque is proportionally controlled in dependence on the torque command $T^*$. In that case by selecting the gain of the ($i_q - \omega^*$) control circuitry sufficiently high, torque can be so controlled as to follow the torque command $T^*$ with high response speed.

Figure 3:
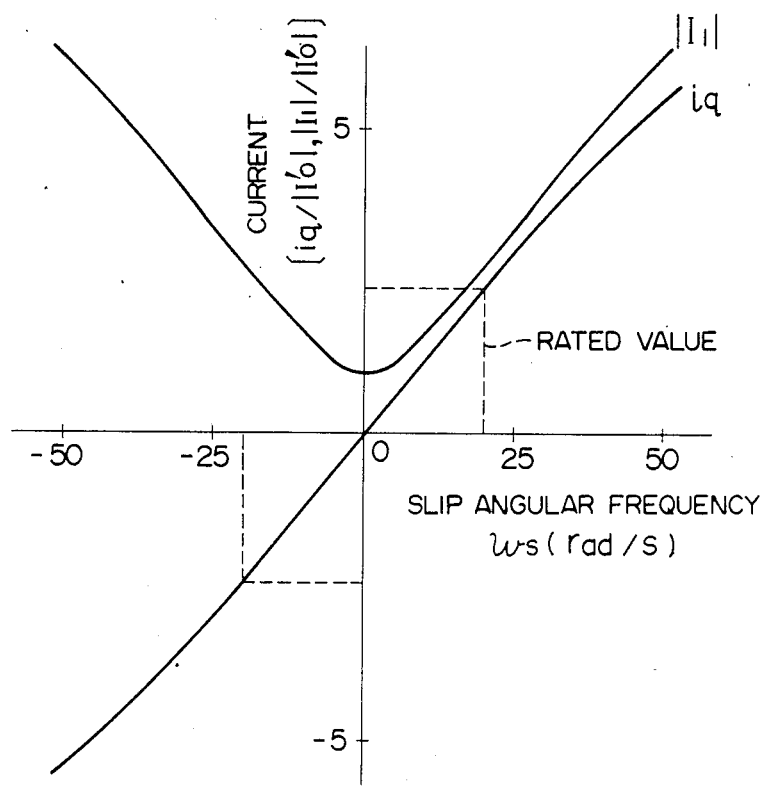
FIG. 3 is a view showing graphically characteristic relationship between a slip frequency and a current for illustrating the control operation.

On the other hand, the slip angular frequency $\omega_s$ bears relation given by the expression (18) to the current component $i_q$. Accordingly, the slip angular frequency $\omega_s$ can be determined on the basis of the current component $i_q$. This determination is accomplished by the function generator 38. A typical example of the $\omega_s - i_q$ characteristic is illustrating FIG. 3. So far as the rated torque is not exceeded, the current component $i_q$ is approximately proportional to the slip angular frequency $\omega_s$. In that case, the function generator 38 may be spared. FIG. 3 further illustrates the characteristic of the primary current $|\hat{I}_1|$ relative to the slip angular frequency $\omega_s$. So far as the range of positive values is concerned, the current component $i_q$ approximately coincides with the primary current $|\hat{I}_1|$, making thus it possible to determine also the estimated slip frequency signal $\hat{\omega}_s$ on the basis of the primary current $|\hat{I}_1|$. Needless to say, the primary current $|\hat{I}_1|$ can be determined from the magnitude of the primary current detection signal $i_1$.

The estimated rotational speed (calculated value) $\omega_r$ can be arithmetically determined in accordance with $$\omega_r = k (\omega_1^* - \hat{\omega}_s) \tag{21}$$

where k represents a proportional constant.

The above calculation is realized at the adder point 39.

The speed deviation amplifier 9 produces the torque command signal $T^*$ ($\alpha i_q^*$) which depends on the deviation between the speed command signal $\omega_r^*$ and the estimated value $\hat{\omega}_r$ thereof, wherein torque is controlled in proportion to the torque command $T^*$, to perform the speed control. As described hereinbefore, since the estimated value $\hat{\omega}_r$ of rotational speed is arithmetically determined by subtracting the slip angular frequency $\omega_s$ from the primary frequency $\omega_1$, decreasing of the rotational speed due to slip which is peculiar to the induction motor can be correctively compensated for. Accordingly, the speed control can be accomplished with higher accuracy when compared with the hitherto known V/F control technique.

The first order delay circuit 37 serves to vary the frequency command $\omega_1^*$ in accompaniment to change of the speed command $\omega_r^*$ so that the frequency control signal $\Delta\omega$ mentioned hereinbefore is meaningful as the command for the slip angular frequency $\omega_s$ in the steady state.

As will now be appreciated from the foregoing description, it is possible to perform the speed control of the induction motor with high response speed and enhanced accuracy without needs for the built-in speed detector and motor voltage detector according to the illustrated enbodiment of the invention.

However, it must be pointed out that a problem remains to be solved. More specifically, since the relation between the voltage commands $V_u^*$, $V_v^*$ and $V_w^*$ and the corresponding actual output voltages is nonlinear for the reason described below, the motor voltage can not be controlled as a linear function of the voltage command, which in turn means that the motor current can not be controlled as a linear function of the command value, whereby the vector control operation is rendered unreliable, thus providing an obstacle in realizing a stable operation of the induction motor with high response speed which is one of the advantageous features characteristic of the vector control.

Now, the reason why the relation between the voltage command and the actual output voltage is nonlinear will be elucidated.

Each of the switching elements which constitute essential parts of the inverter 1 can be turned on or off only with a time lag or delay. Accordingly, in order to prevent a short-circuit from occurring between the bridge arms of positive and negative polarities, the gate signal associated with the PWM pulse is imparted with on-delay time $t_d$ as indicated by broken lines in FIG. 4 at (b) and (c). The on-delay time $t_d$ is usually set at a value which is twice or thrice as great as the turn-off time of the switching element. Assuming now that the line voltage ($=E_{U-N} - E_{V-N}$) between the U- and V-phases is determined with the on-delay time $t_d$ being neglected, the line voltage is of such a waveform as shown by a solid line curve in FIG. 4 at (d). Now, let's determine the line voltage between U- and V-phases with the on-delay time $t_d$ being taken into account at this time. Assuming that the output current of the inverter 1 which flows into the induction motor 2 from the inverter is of positive polarity and that the U-phase current is of positive polarity while the V-phase current is negative, the U-phase current will then flow through the diodes connected in anti-parallel with the switching elements of the negative arm during the on-delay period. Consequently, the U-phase potential is minum (−) during the on-delay period. On the other hand, the V-phase current of negative polarity will flow through the anti-parallel diodes of the positive arm during the on-delay period. Consequently, the V-phase potential is plus (+) during the on-delay period. Thus, the U- and V-phase voltages assume the waveforms shown in FIG. 4 at (e) and (f), respectively, in case the on-delay time is taken into consideration. Consequently, the line voltage ($V_{U-N} - V_{V-N}$) between U- and V-phases is of a waveform indicated by broken lines and hatched areas at (d) in FIG. 4 and is apparently smaller than the solid-line waveform depicted on the assumption that the on-delay time is neglected.

As is known in the art, the turn-off time of the switching element varies in dependence on magnitude of the current flowing through the switching element (i.e. the output current of the inverter 1). Accordingly, time taken for the switching elements of the positive and negative arms to be turned off simultaneously during the on-delay period varies as a function of magnitude of the output current of the inverter 1. In other words, magnitude of the hatched portion of the waveform indicated by broken line in FIG. 4 at (d) for which the on-delay time is taken into consideration varies in dependence on magnitude of the output current of the inverter 1.

As will be understood from the foregoing analysis, the voltage drop due to the on-delay phenomenon (i.e. delay involved in the turning-on of the switching element) occurs every on/off period of the switching element. So far as the PWM switching frequency is sufficiently high when compared with the output frequency of the inverter, the voltage drop (fundamental wave component) is in phase with the output current of the inverter. In this respect, the voltage drop under consideration behaves like a voltage drop produced across an ohmic resistor.

On the other hand, the magnitude of the voltage drop bears non-linear relation to the inverter output current. This characteristic can be measured in the manner mentioned below.

Figure 5:
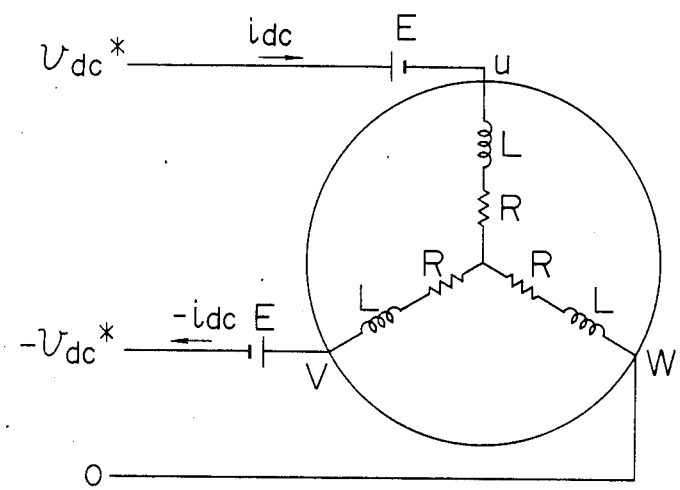
FIG. 5 is a schematic circuit diagram for illustrating the working principle underlying a method of measuring internal voltage drop of the inverter according to the invention.

Assuming now that the phase voltage command signals $V_U^*$, $V_V^*$ and $V_W^*$ are so set that $V_U^* = V_{dc}^*$, $V_V^* = -V_{dc}^*$ and $V_W^* = 0$, FIG. 5 illustrates an equivalent circuit in which the motor is supplied with DC currents from the inverter. In the figure, E represents the aforementioned voltage drop in the inverter, and R represent resistances of the motor windings and interconnecting or wiring conductors between the inverter and the motor. On these given conditions, relation between the voltage command $V_{dc}^*$ and the DC output current $i_{dc}$ of the inverter is given by the following expression:

$$V_{dc}^* = R \cdot i_{dc} + E(i_{dc}) \tag{22}$$

Figure 6:
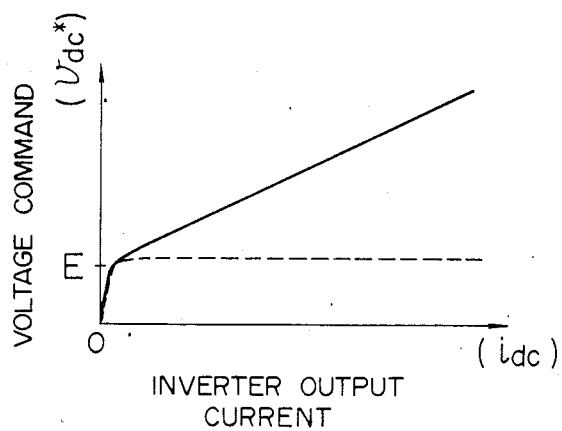
FIG. 6 is a view for illustrating graphically a characteristic relation between the internal voltage drop of the inverter and a preset command value of a function generator.

It will be seen that the voltage drops E and $R \cdot i_{dc}$ can be determined on the basis of the voltage command $V_{dc}^*$. When the resistance R is previously known, the internal voltage drop E of the inverter can be handled separately from the voltage drop $R \cdot i_{dc}$ due to the resistances of the motor windings and the interconnecting conductors. An example of the result of the measurement is graphically illustrated in FIG. 6. As will be seen in the figure, magnitude of the voltage drop is in a non-linear relation to the output current. Consequently, in case the inverter output current is an alternating current, the voltage drop can contain harmonic components.

To deal with the above problem, the internal voltage drop E of the inverter and the voltage drop R.i due to resistances of the motor windings and the wiring conductors are previously measured, wherein the characteristic data determined through the measurement are stored in memories incorporated in the function generators 4U, 4V and 4W, respectively, so that the data can be read out in accordance with the inverter output currents for thereby compensating the voltage drops E and R.i associated with the output currents, respectively. This voltage-drop compensation can be accomplished by the circuitry composed of the function generators 4U, 4V and 4W, the three-phase/two-phase converter 16, the coordinate transformation circuit 17 and the adders 15 and 28. More specifically, the voltage drop signals $\Delta V_U^*$, $\Delta V_V^*$ and $\Delta V_W^*$ are converted to two phase signals $\Delta V_\alpha^*$ and $\Delta V_\beta^*$ which are then transformed to the quantities $\Delta V_d^*$ and $\Delta V_q^*$ pertaining to rotating field coordinate system to be subsequently applied to the adders 15 and 28 for modifying correctively the voltage command signals $V_d^*$ and $V_q^*$ to $V_d^{*}$ and $V_q^{*}$ which are the voltage commands modified to compensate for the voltage drops. Through the process mentioned above, the induced electromotive force of the induction motor can be controlled so as to coincide with the voltage command $V_d^*$ and $V_q^*$ by compensating for the actual voltage drops with the aid of the corresponding estimated quantities stored as mentioned above.

In this connection, it is noted that when the sum of the internal voltage drop E of the inverter and the voltage drop R.i due to the resistance of the windings and the wiring conductors is set as the input-output characteristic of the function generator, both voltage drops E and R.i can be compensated for. However, it is impossible to suppress the occurrence of a DC component of the inverter output current due to the DC component of the inverter output voltage which is brought about by the unbalance between the positive and negative sides of the switching element of the inverter. In view of this, it may be preferred that the compensation for the voltage drops be effected on the basis of the sum of E and R.i from which a quantity relating to the inverter output current has been previously subtracted. By way of example, the contents to be loaded to the function generators 4U, 4V and 4W may be set to meet the following condition:

$$\text{Output of Function Generator} = (R - K)i + E \tag{23}$$

where K.i represents the quantity relating to the output current as mentioned above. It should however be noted that the quantity under consideration need not necessarily be proportional to the current i but may bear any other relation to the latter, to a similar effect.

Next, a method of automatically setting the content of the function generator will be described.

Although the aforementioned voltage drop E is inherent to the inverter, the voltage drop R.i may vary in dependence on the motor connected actually to the inverter as well as the resistance of the wiring conductors as employed. The contents of the function generators 4U, 4V, 4W are to be set in consideration of both the constant voltage drop E and the variable voltage drop Ri. However, this procedure may be troublesome. In view of this, description will be made of a method of automatically measuring these voltage drops and automatically setting the contents or data to be loaded in the function generators.

The above method can be carried out with the aid of the circuitry including the DC voltage command circuit 21, the coefficient multipliers 22U, 22V and 22W, the switch circuit 20 and a meter 5.

In precedence to the actual operation of the motor, the voltage drops E and R.i are first measured in the manner mentioned below. Namely, a DC voltage command $V_{dc}^*$ is produced by the DC voltage command circuit 21, which is followed by setting the voltage commands $V_U^*$, $V_V^*$ and $V_W^*$ for three phases, respectively, such that $V_U^* = V_{dc}^*$, $V_V^* = -V_{dc}^*$ and $V_W^* = 0$ through the coefficient multipliers 22U, 22V and 22W, respectively. At that time, the switch circuit 20 is changed over to the position designated by a. In this state, DC current $i_{dc}$ will flow from the inverter. By reading the DC voltage command $V_{dc}^*$ corresponding to the DC current $i_{dc}$, a characteristic like the one shown in FIG. 6 can be obtained. This characteristic is set at the function generators 4U, 4V and 4W.

Upon actual operation of the motor, the switch circuit 20 is changed over to the position denoted by b to thereby allow the output voltage to be controlled in dependence on the output signals $V_U{}^*$, $V_V{}^*$ and $V_W{}^*$ of the two-phase/three-phase converter 19, whereby the voltage drops in concern are compensated for by the signals $\Delta V_U{}^*$, $\Delta V_V{}^*$ and $\Delta V_W{}^*$ outputted from the function generators 4U, 4V and 4W, as described hereinbefore. Additionally, in order to suppress the DC component of the inverter output current, the quantity relating to the latter may be subtracted from the result of the aforementioned measurement so that the more appropriate characteristic data can be placed in the function generators.

Figure 7:
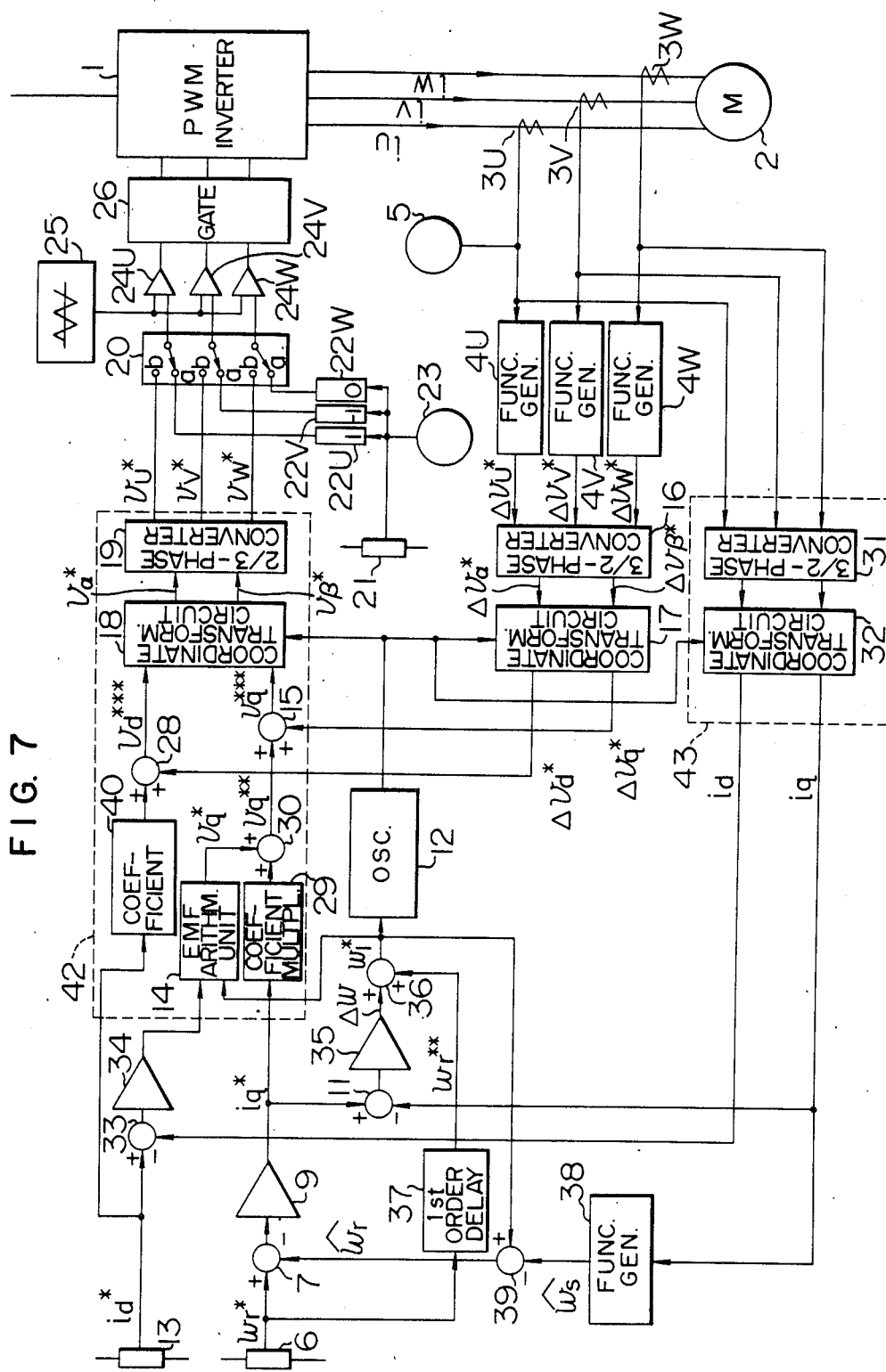
FIGS. 7, 8, 9, 10 and 11 are circuit diagrams showing, respectively, circuit arrangements of the control circuit according to other embodiments of the invention.

FIG. 7 shows another embodiment of the invention which differs from the system shown in FIG. 1 in that the exciting current i is detected to control the inverter output voltage in accordance with deviation between the detected exciting current $i_d$ and the associated command value $i_d{}^*$. As described hereinbefore, the exciting current $i_d$ can be maintained constant by controlling the ratio $|E'_1|/\omega_1$ to be constant. However, in practical applications, the exciting current may undergo variations transiently upon abrupt acceleration or deceleration. It is therefore proposed according to the instant embodiment of the invention that the exciting current $i_d$ is detected and that the amplitude of the primary voltage command $V_1{}^*$ is correctively controlled so that the exciting current $i_d$ assumes constantly a predetermined value.

In FIG. 7, a reference numeral 43 denotes an exciting current component detector for detecting a component $i_d$ of the exciting current which is out of phase by 90° relative to the phase reference of the inverter output voltage (induced electromotive force), 33 denotes an adder or adding point for deriving the deviation between the detected exciting current component $i_d$ and the relevant command value $i_d{}^*$, 34 denotes an exciting current deviation amplifier for amplifying the deviation, and 42 denotes a multiplier for multiplying the output signal of the amplifier 34 with the frequency command $\omega_1{}^*$ for outputting a signal for setting the amplitude of the primary, voltage command $V_1{}^*$. Other circuit components the same as or equivalent to those shown in FIG. 1 are denoted by like reference numerals and further description of these components is omitted.

In operation, the current component detector 43, indicated as enclosed by a broken line in FIG. 7 detects the exciting current component $i_d$ in accordance with $$i_d = e_\beta \cdot i_\alpha - e_\alpha \cdot i_\beta$$

where $e_\alpha$, $e_\beta$, $i_\alpha$ and $i_\beta$ represent the quantities defined hereinbefore.

Next, the deviation or difference between the exciting current command value $i_d{}^*$ and the exciting current $i_d$ as detected is amplified through the exciting current deviation amplifier 34 to be subsequently multiplied with the frequency calculator indicated generally broken line block 42 in FIG. 7 to prepare an amplitude setting signal for the primary voltage command $V_1{}^*$. The voltage command calculator 42 multiplies the amplitude setting signal with a phase reference signal for the induced electromotive force supplied from the oscillator 12 to produce voltage commands $V_1{}^*$ for U-, V- and W-phases, respectively. Other operation of the system shown in FIG. 7 is same as described hereinbefore in conjunction with FIG. 1. Because the exciting current $i_d$ is controlled to coincide constantly with the exciting current command value $i_d{}^*$ in this way, it is possible to suppress excursion or fluctuation of the exciting current $i_d$.

Figure 8:
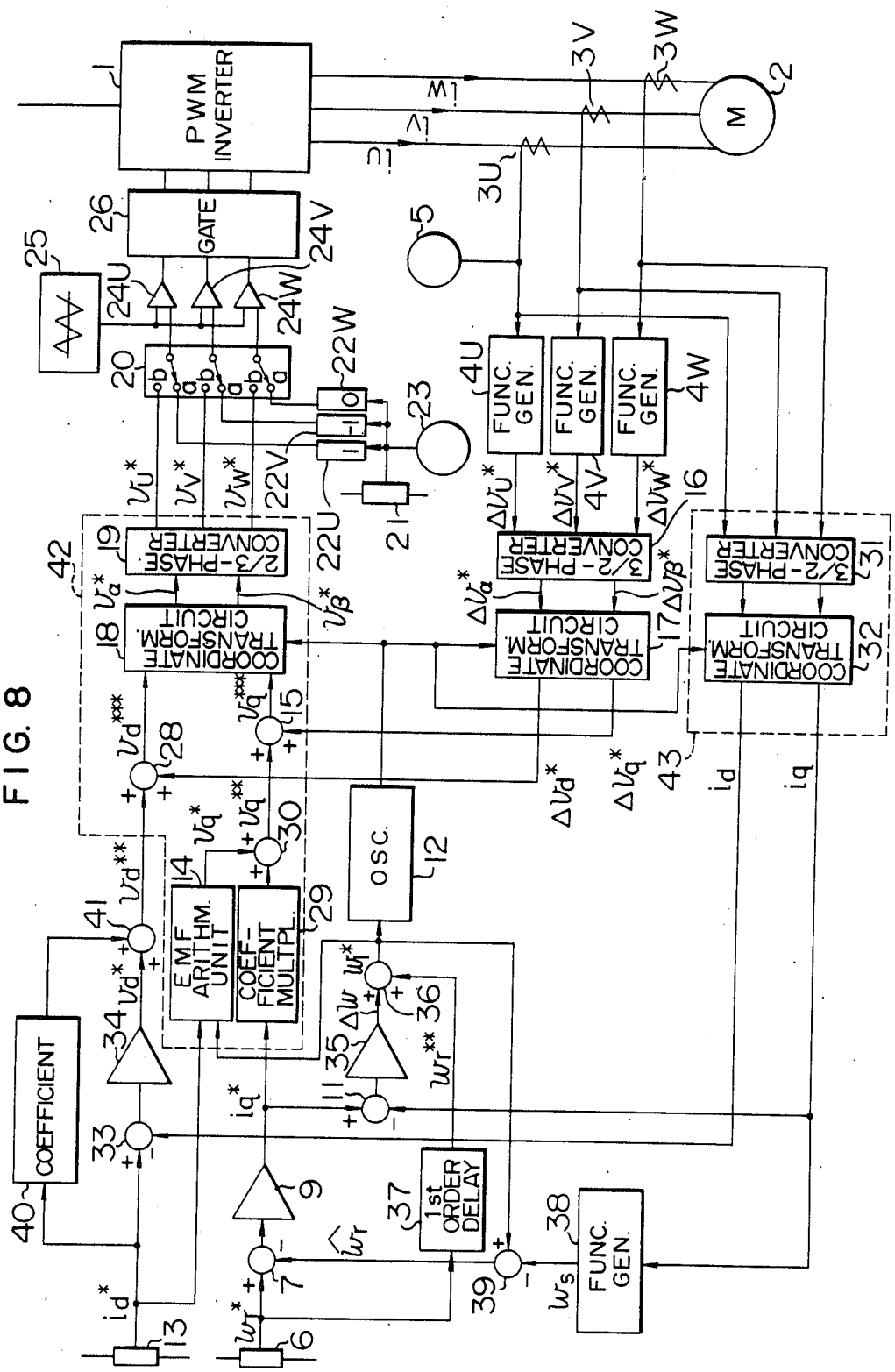

FIG. 8 shows still another embodiment of the invention which differs from the one shown in FIG. 7 in that the d-axis component of the inverter output voltage is controlled in dependence on difference or deviation between the exciting current $i_d$ as detected and the associated command values $i_d{}^*$. As described above, the exciting current $i_d$ can be certainly maintained constant by correctively controlling the amplitude of the primary voltage command $V_1{}^*$ so that the exciting current $i_d$ as detected assumes constantly a predetermined value. However, in practical applications, there may happen such a situation in which the exciting current $i_d$ and the torque current $i_q$ undergo fluxuation in response to change in the load, bringing about mutual interference which tends to degrade the control characteristic.

In light of the above, the embodiment shown in FIG. 8 is so configured that the exciting current $i_d$ as detected is controlled to assume a predetermined value constantly, as described below.

Referring to FIG. 8, the exciting current command circuit 13 outputs the exciting current command $i_d{}^*$ for the motor. This signal $i_d{}^*$ is applied to the induced EMF arithmetic unit 14, the adder 33 and the coefficient multiplier 40. The adder 33 outputs the deviation between the exciting current command $i_d{}^*$ and the detected exciting current $i_d$, the deviation signal being applied to the current deviation amplifier 34 which in turn outputs a voltage command signal $V_d{}^*$ which depends on the current deviation mentioned above. This signal $V_d{}^*$ is then applied to the adder 41. On the other hand, the coefficient multiplier 40 multiplies the command signal $i_d{}^*$ with a coefficient k. The output signal $k \cdot i_d{}^*$ of the coefficient multiplier 40 is applied to the adder 41 where the former is added with the output signal $V_d{}^*$ of the current deviation amplifier 34, resulting in an updated voltage command signal $V_d{}^{**}$ being outputted, which is then applied to the adder 28.

In operation, the deviation between the exciting current command $i_d{}^*$ issued by the command circuit 13 and the detected exciting current $i_d$ is amplified through the amplifier 34 to derive the voltage command $V_d{}^*$. The d-axis voltage component $V_d$ (i.e. voltage component orthogonal to the induced electromotive force) is controlled as a function of the voltage command $V_d{}^*$ so that the detected exciting current $i_d$ coincides with the exciting current command $i_d{}^*$.

By taking advantage of the fact that the motor torque, slip frequency and the torque current component $i_q$ are proportional to one another, the slip frequency $\omega_s$ is estimated on the basis of the signal $i_q$ by the slip calculator 38. The estimated slip signal $\hat{\omega}_s$ is subtracted from the frequency command signal $\omega^*$ by the adder 39 to detect the estimated speed signal $\hat{\omega}_r$. Deviation between the speed command signal $\omega_r{}^*$ and the estimated speed signal $\hat{\omega}_r$ is amplified by the amplifier 9 to derive the torque current command $i_q{}^*$. Additionally, deviation between the torque current command $i_q{}^*$ and the detected torque current $i_q$ is amplified by the amplifier 35, whereby the frequency command $\omega_1{}^*$ is determined on the basis of the output deviation signal $\Delta\omega$ of the amplifier 35. When the detected torque current $i_q$ is small as compared with the torque current command $i_q^*$, the frequency command $\omega_1$ is increased, which causes the slip frequency to increase, which in turn causes the torque current $i_q$ to be increased. The above description also holds true in the reverse operation of what has been described above. The torque current $i_q$ is controlled so as to coincide with the torque current command $i_q^*$. Further, the signals $\omega_1^*$ and $i_d^*$ are multiplied with each other to derive the voltage command $V_q^*$ which provides a basis for controlling the q-axis voltage component $V_q$ (i.e. voltage component in phase with the induced electromotive force). As a result, the ratio between the induced electromotive force and the frequency is controlled to be constant (i.e. flux is constant).

In this way, control of the induction motor can be accomplished in the same manner as the case of a DC motor by controlling the motor flux so as to assume a predetermined value depending on the exciting current command $i_d^*$, while the slip frequency and torque are controlled in dependence on the torque current command $i_q^*$.

Figure 9:
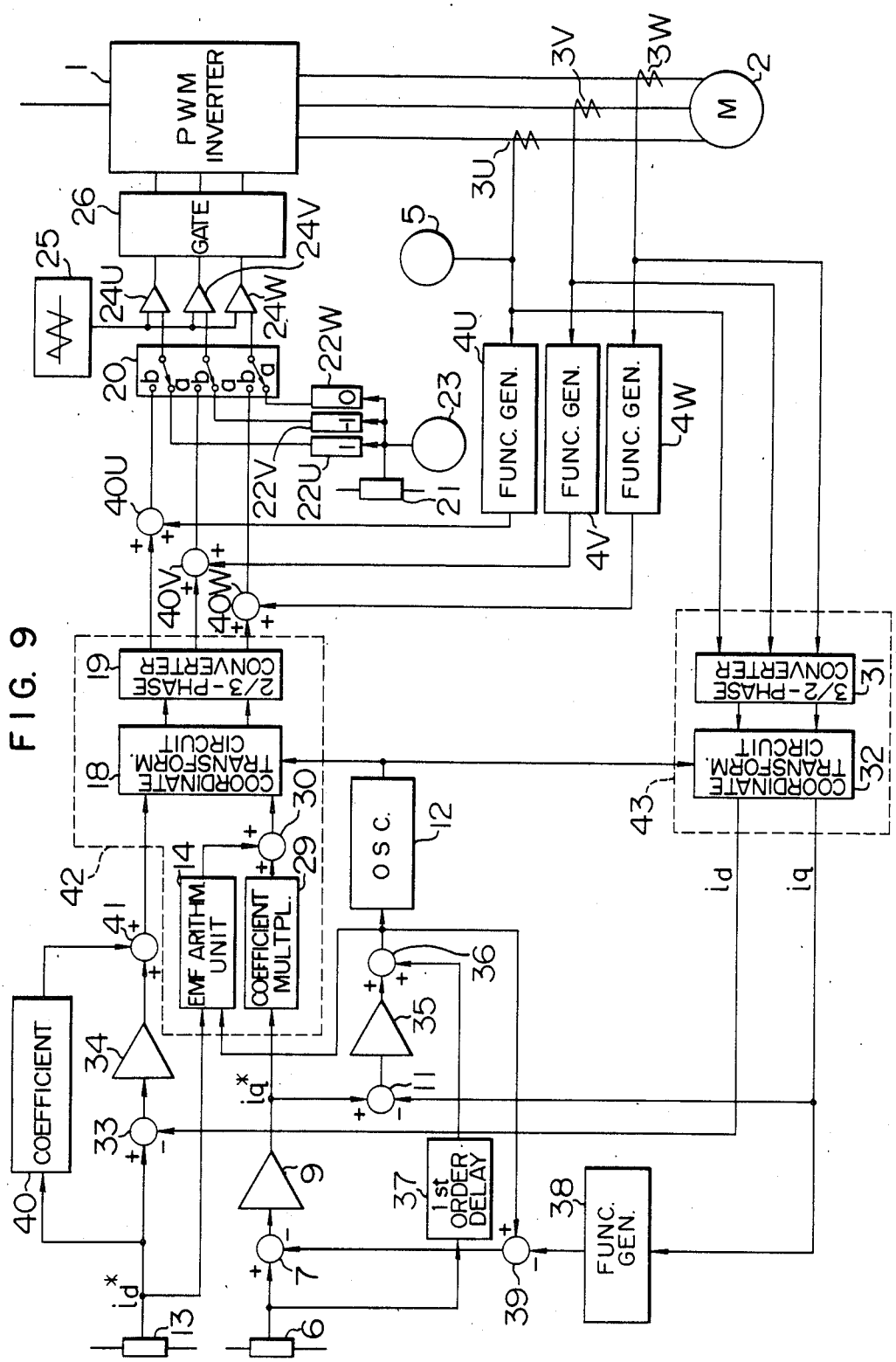

FIG. 9 shows a further embodiment of the invention. In the figure, like parts as those shown in FIG. 8 are denoted by like reference numerals and repeated description thereof is omitted. The embodiment shown in FIG. 9 differs from the one shown in FIG. 8 in that the outputs of the function generators 4U, 4V and 4W are added to AC voltage command signal $U_u^*$, $V_v^*$ and $V_w^*$, respectively.

More specifically, the two-phase/three-phase converter 19 outputs the voltage command signals $V_u^*$, $V_v^*$ and $V_w^*$ which have a frequency proportional to the frequency command signal $\omega_1^*$ and are out of phase with one another by 120°. These voltage command signals $V_u^*$, $V_v^*$ and $V_w^*$ are applied to the adders 40U, 40V and 40W, respectively, through which the voltage command signal $V_u^*$, $V_v^*$ and $V_w^*$ are added in terms of vector with the output signals $\Delta V_u^*$, $\Delta V_v^*$ and $\Delta V_w^*$ of the function generators 4U, 4V and 4W, respectively, with the illustrated polarity, whereby the voltage command signal $V_u^{}$, $V_v^{}$ and $V_w^{**}$ are produced and supplied to the switch circuit 20.

The embodiment shown in FIG. 9 can assure the similar effect as that of the embodiment shown in FIG. 8 and enjoy additional advantage in that the converters 16 and 17 required in the case of the system shown in FIG. 8 can be spared, to simplify the system structure.

Figure 10:
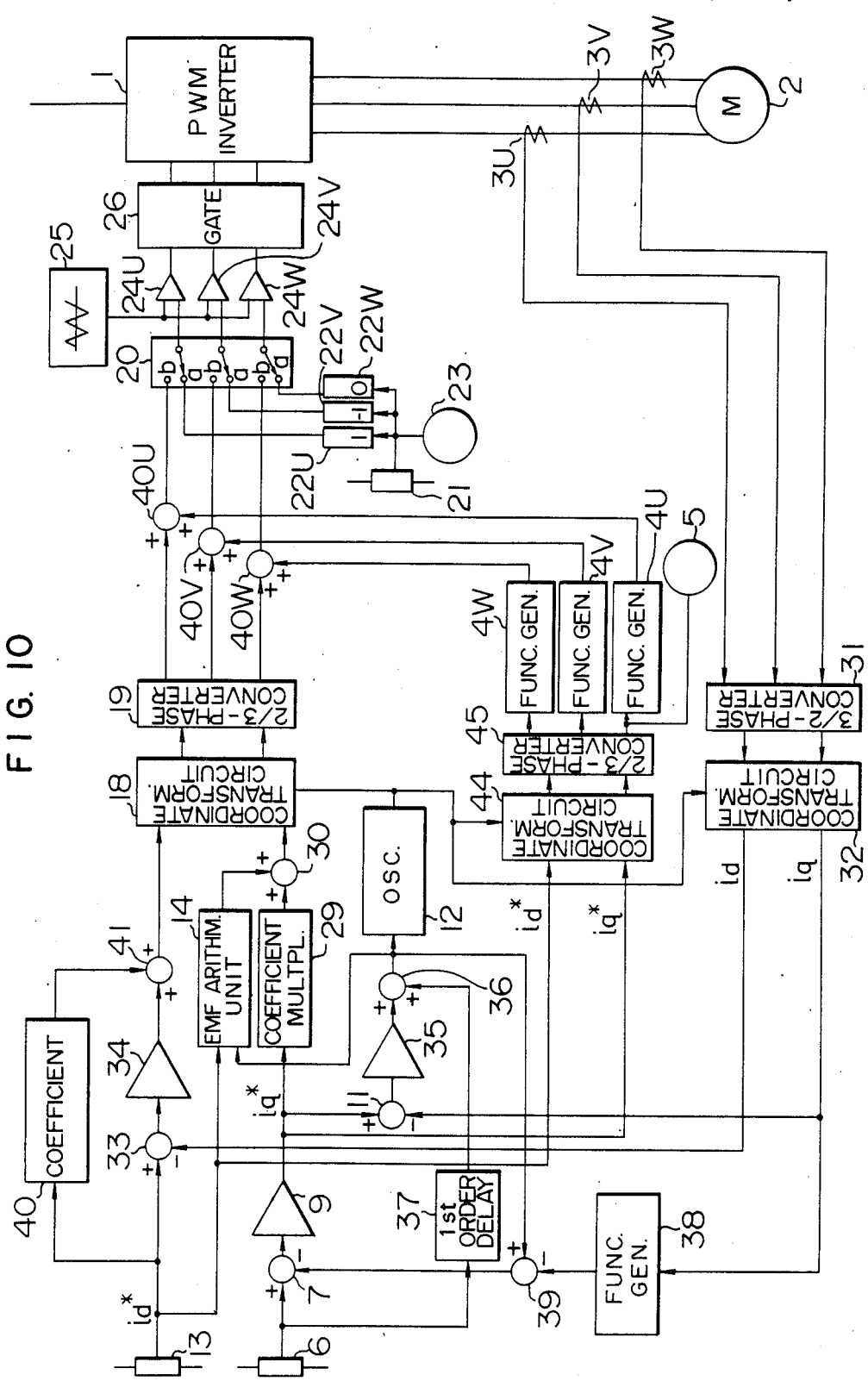

FIG. 10 shows a further embodiment of the invention. In the figure, like parts as those shown in FIG. 9 are denoted by like reference numerals and description thereof is omitted. The system shown in FIG. 10 differs from the one shown in FIG. 9 in that current command signals $i_u^*$, $i_v^*$ and $i_w^*$ are employed as the input signals to the function generators 4U, 4V and 4W, respectively.

More specifically, the coordinate transformation circuit 44 functions to transform the output signal $i_d^*$ of the exciting current command circuit 13 and the output signal $i_q^*$ of the speed deviation amplifier 9 (both of which are quantities in the rotating field orientated frame) to the quantities in the stator reference frame (coordinate system) on the basis of the sinusoidal signal produced by the oscillator 12, whereby two-phase AC signal $i_\alpha^*$ and $i_\beta^*$ are produced. These signals $i_\alpha^*$ and $i_\beta^*$ are applied to the two-phase/three-phase converter 45, resulting in that the current command signals $i_u^*$, $i_v^*$ and $i_w^*$ having a frequency proportional to the frequency command signal $\omega_1^*$ and phase-shifted by 120° to one another are derived, which are then applied to the function generators 4U, 4V and 4W, respectively.

The system shown in FIG. 10 can assure the similar effect to that of the embodiment shown in FIG. 9 and provides additional advantage that the current commands $i_u^*$, $i_v^*$ and $i_w^*$ are insusceptible to influence of harmonic noise contained in the motor current because the current command contains only the fundamental wave component.

In the foregoing the invention has been described in conjunction with the exemplary embodiments in which analogue circuits are employed for facilitating elucidation of operation. It is however obvious that the invention can be equally applied to the system in which a microprocessor-based digital control is adopted.

Figure 11:
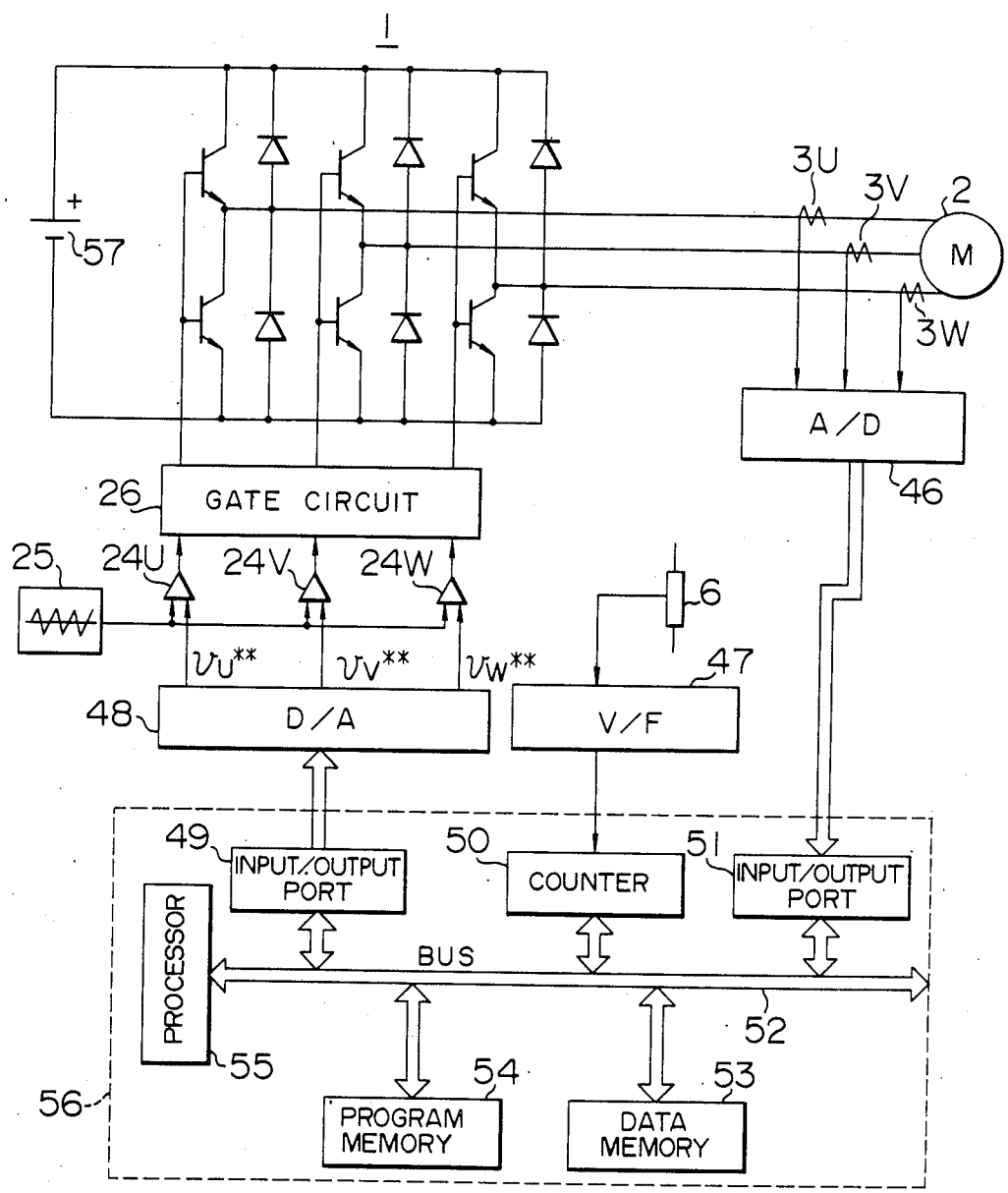

FIG. 11 shows another exemplary embodiment of the invention applied to a digital control system.

Referring to FIG. 11, the primary currents $i_u$, $i_v$ and $i_w$ or U-, V- and W-phases of an induction motor 2 (output currents of the inverter 1) are detected by current detectors 3U, 3V and 3W, respectively, and applied to analoque-to-digital (A/D) converters 46, respectively.

A digital arithmetic circuit 56 is composed of a processor 55 for executing arithmetic processings, a program memory 54 storing a control program, a data memory 53 for storing data, input/output ports 49 and 51, a counter 50 and address/data bus 52 interconnecting these elements. Prior to the operation of the induction motor 2, the processor 55 causes the inverter 1 to supply a DC current to the induction motor 2 for measuring the characteristic relation between the DC voltage command and the DC current (i.e. the characteristic illustrated graphically in FIG. 6) in accordance with the processing procedure of the control program stored in the memory 54. The result of the measurement is loaded in the data memory 53. In operation of the induction motor 2, the processor 55 fetches the value of the counter 50 which is adpated to count the output signal of a voltage-to-frequency (V/F) converter 47 by way of the bus 52 in accordance with the processing procedure given by the control program stored in the memory 54 to thereby arithmetically determine the voltage commands $V_u^*$, $V_v^*$ and $V_w^*$ for the induced EMF of the induction motor 2. Additionally, the processor 55 fetches the output current of the inverter 1 through the input/output port 51 and reads out from the data memory 53 by way of the bus 52 the voltage command values $\Delta V_u^*$, $\Delta V_v^*$ and $\Delta V_w^*$ having such magnitude and polarity as required for compensating for the voltage drop. These voltage command values $\Delta V_u^*$, $\Delta V_v^*$ and $\Delta V_w^*$ are added, respectively, to the voltage command pattern signals $V_u^*$, $V_v^*$ and $V_w^*$ which have been previously determined, as mentioned above. The results of the addition are outputted from the input/output port 49 by way of the bus 49 to be susbequently applied to a digital-to-analogue (D/A) converter 48.

Figure 12:
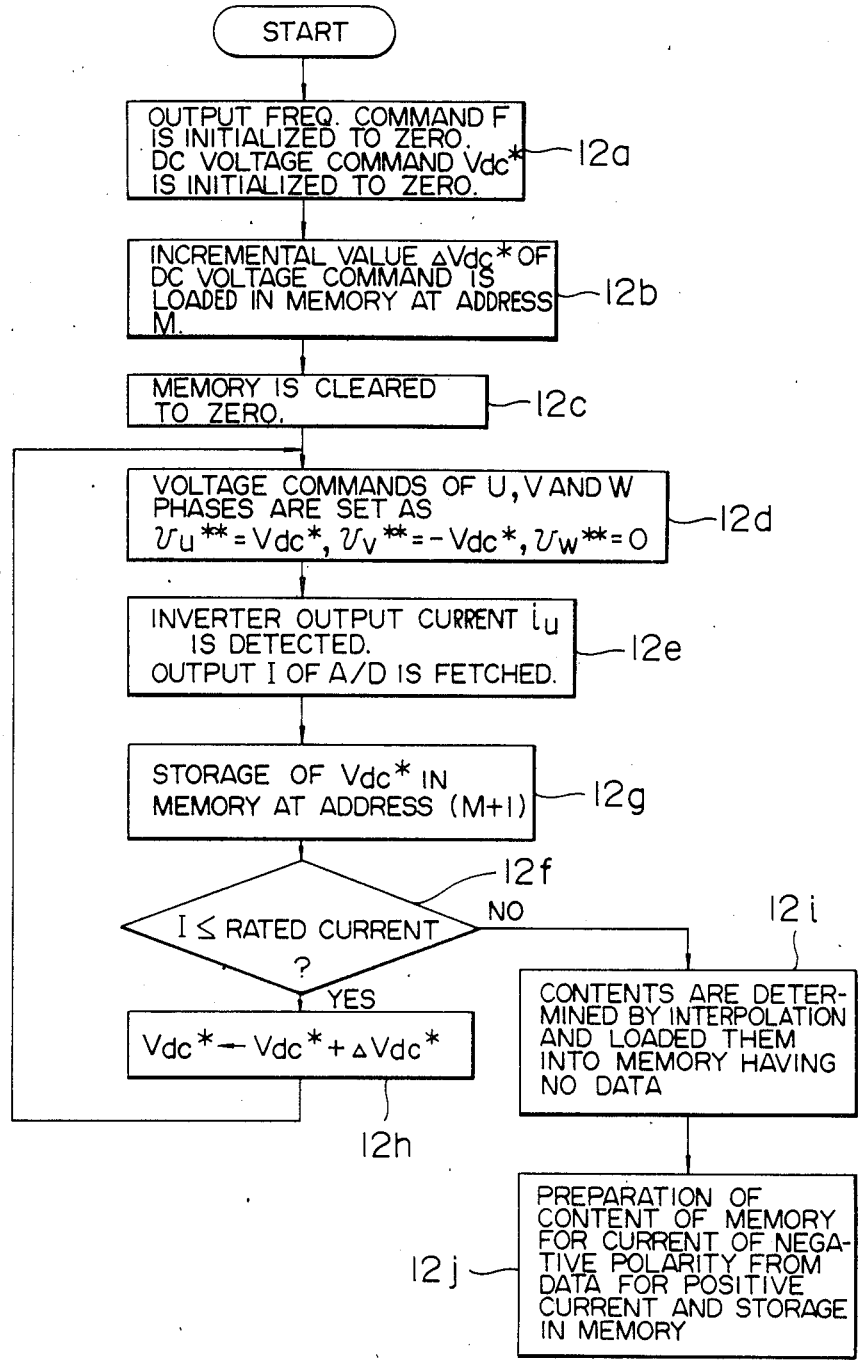
FIGS. 12 and 13 are views for illustrating in flow charts processings executed in the control circuit shown in FIG. 11.
Figure 13:
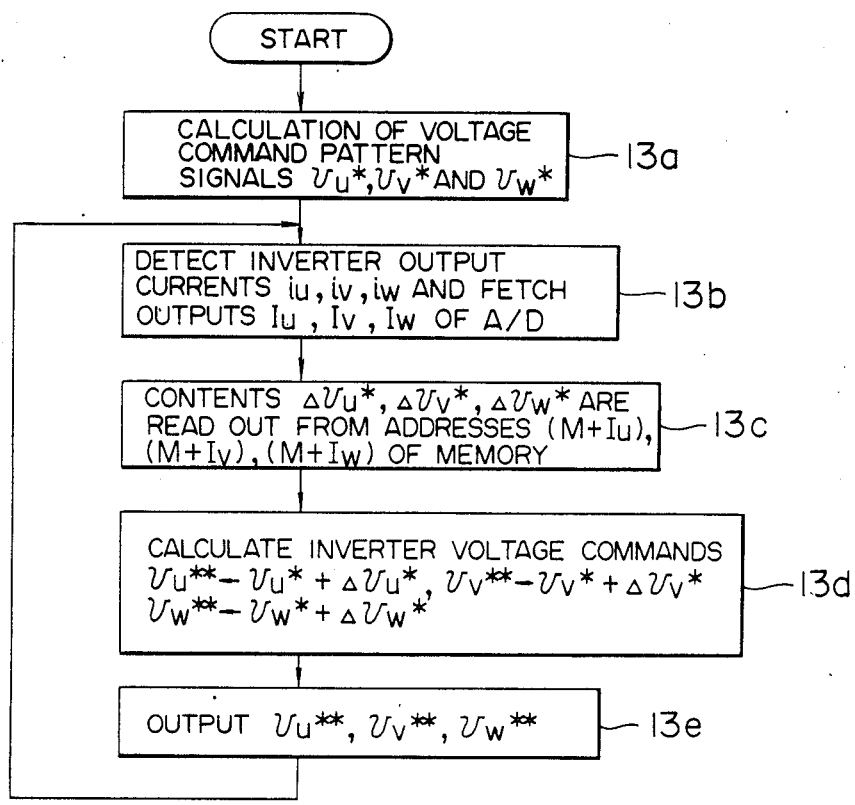

Next, operation for compensating for the internal voltage drop of the inverter will be elucidated by reference to FIGS. 12 and 13.

At first, description will be made of a method of preparing data for compensating the deviation between the induced electromotive force of the induction motor 2 and the voltage command pattern signal for the inverter 1 and storing the data thus determined in the memory 53. To this end, the induction motor 2 is supplied with a DC current $i_{dc}$ from the inverter 1 prior to the actual operation of the motor on the same principle as that described hereinbefore in conjunction with the system shown in FIG. 1.

Referring to FIG. 12, an output frequency command f* for the inverter is set to zero (i.e. DC current) while the DC voltage command $V_{dc}^*$ is initialized to zero at a block or step 12a. Subsequently, at a step 12b, incremental values $\Delta V_{dc}^*$ of the DC voltage command $V_{dc}^*$ for varying the DC current $i_{dc}$ of the inverter 1 from zero to a rated current value and the aforementioned data are stored in the data memory 53 at a leading address M. At a step 12c, the content of the data memory 51 is cleared to zero. At a step 12d, the voltage command $V_u^{**}$ for U-phase is set to $V_{dc}^*$, the while the voltage command $V_v^{**}$ for V-phase is set to $-V_{dc}^*$ with the voltage command $V_w^{**}$ for W-phase being set to zero. The voltage commands are then outputted through the input/output port 49.

At a step 12e, the output current $i_u$ of the inverter 1 corresponding to the DC voltage command $V_{dc}^*$ is detected by the current detector 3U and supplied to the A/D converter 46. The digital signal I outputted from the A/D converter 46 is fetched through the input/output port 51 by way of the bus 52. At a step 12f, it is decided whether the output current I (digital value) of the inverter 1 is of the rated value. In case the output current I is below the rated current value, the result of arithmetic operation in accordance with (DC voltage command $V_{dc}^* - K.I$) is written in the data memory 53 at an address M+1 by way of the bus 52 at a step 12g. In the above expression, K represents the same constant as the one appearing in the expression (23).

At a step 12h, the DC voltage command $V_{dc}^*$ is incremented by the incremental value $\Delta V_{dc}^*$ to prepare the updated DC voltage command $V_{dc}^*$. The procedure then returns to the step 12d to repeat the execution of the steps 12d to 12h.

When it is found at the step 12f that the output current I of the inverter 1 is not smaller than the rated value, then the content at the address of the memory 53 where no data has been written is determined through interpolation technique and written in the data memory by way of the bus 52 at a step 12i. Further, in order to prepare the content of the data memory for the current of negative polarity, the data for the current of positive polarity are read out by way of the bus 52, inverted in respect to the sign and again written in the data memory 53 by way of the bus 52 at a step 12j.

Thus, the processing prior to the operation of the induction motor 2 is completed. Succeedingly, the operation of the induction motor 2 is started.

Now, description will be made in conjunction with operation of the induction motor 2. Referring to FIG. 13, at a step 13a, the output pulse signal of the V/F converter 47 which converts the output signal of the speed command circuit 6 to a train of pulses is counted by the counter 50 and fetched by way of the bus 52 to arithmetically determine the amplitude values of the voltage command pattern signals $V_u^*$, $V_v^*$ and $V_w^*$ for the induced electromotive force of the induction motor 2.

At a step 13b, the output current $i_u$, $i_v$ and $i_w$ of the inverter 1 are detected by the current detectors 3U, 3V and 3W, respectively, and applied to the A/D converter 46, the digital outputs IU, IV and IW thereof being fetched through the input/output port 51 by way of the bus 52. At a step 13c, the contents of the data memory 53 are read out in dependence on the magnitude and polarity of IU, IV and IW. The contents thus read out are represented by $\Delta V_u^*$, $\Delta V_v^*$ and $\Delta V_w^*$, respectively.

At a step 13d, the voltage command pattern signals $V_u^*$, $V_v^*$ and $V_w^*$ determined at the step 13a are, respectively, added with $\Delta V_u^*$, $\Delta V_v^*$ and $\Delta V_w^*$ read out at the step 13c. At a step 13d, the results of the addition at the step 13d are outputted through the input/output port 49 by way of the bus 52.

The routine including the steps 13b to 13e is repeated. In the foregoing description, it has been assumed that the contents of the data memory 53 are read out with the aid of the processor 55 also in the motor operation mode. It will however be appreciated that the contents of the data memory 53 can be read out directly through the input/output port by way of the bus 52 provided that the outputs of the A/D converter 46 are set in one-to-one correspondence with the addresses of the data memory 53 (e.g. the leading address of M of the data memory is set to zero).

The instant embodiment can assure the advantageous effect mentioned hereinbefore in conjunction with FIG. 9. Besides, the processing can be performed continuously from the preparation processing preceeding to the operation of the motor to the processing in the course of operation of the induction motor. By virtue of this feature, the advantageous effect mentioned in conjunction with FIG. 9 can be retained even when combination of the inverter and the induction motor is altered.

As will be appreciated from the foregoing description, it is possible according to the teachings of the present invention to control the rotational speed of the induction motor with high accuracy without resorting to the use of detectors such as speed detectors, voltage detectors and the like. Further, degradation of the control characteristic due to the internal voltage drop of the voltage-type inverter and occurrence of torque ripple can be positively prevented, whereby the motor control can be performed with significantly improved accuracy and reliability.

We claim:

1. A method of controlling an induction motor driven by a voltage-type inverter, wherein the magnitude and phase of a primary current supplied to said induction motor are controlled by controlling a torque current component and an exciting current component independently and by controlling an output voltage of said inverter, said method comprising the steps of:

detecting a value of said primary current flowing to said induction motor;

determining said torque current component based on the detected value of said primary current and a phase reference signal for controlling said output voltage of said inverter;

controlling said output voltage and corresponding frequency of said votlage-type inverter in accordance with said torque current component;

estimating rotational speed of said induction motor based on said torque current component;

comparing said estimated rotational speed of said induction motor with a speed command signal; and controlling the rotational speed of said induction motor based on the result of such comparison.

2. A method of controlling an induction motor according to claim 1, wherein prior to actual operation of said induction motor, characteristic relation of the inverter output current to an inverter output voltage command is determined to store data representative of voltage command value corresponding to the inverter output current value, the voltage command value corresponding to the output current value of the inverter being read out from the storage in the operation of said induction motor and added to said inverter output voltage command for compensating voltage drops in said inverter, said induction motor and connections therebetween.

* * * * *